United States Patent [19]
Ebihara et al.

[11] 4,001,808
[45] Jan. 4, 1977

[54] ELECTRONIC DEVICE FOR MONITORING POWER CONSUMPTION OF AN ELECTRO-OPTICAL DISPLAY

[75] Inventors: Heihachiro Ebihara; Fukuo Sekiya, both of Tokorozawa, Japan

[73] Assignee: Citizen Watch Co. Ltd., Tokyo, Japan

[22] Filed: June 25, 1975

[21] Appl. No.: 590,197

[30] Foreign Application Priority Data

July 17, 1974 Japan .............................. 49-81867

[52] U.S. Cl. .............................. 340/336; 58/50 R; 340/248 B
[51] Int. Cl.² .......................................... G09F 9/32
[58] Field of Search ............... 340/248 B, 249, 336, 340/324 R; 58/50 R, 152 R, 23 BA

[56] References Cited

UNITED STATES PATENTS

| | | |
|---|---|---|
| 3,898,790 | 8/1975 | Takamune et al. ............ 340/248 B |
| 3,943,500 | 3/1976 | Buchanan .......................... 340/336 |

*Primary Examiner*—Marshall M. Curtis
*Attorney, Agent, or Firm*—Sherman & Shalloway

[57] ABSTRACT

An electronic device for use with a battery driven electro-optical display, wherein the device includes circuitry for detecting an increase in the rate of electric power consumption of the display, and generates a signal upon detecting the increase. The device includes an alarm which operates, when the signal is received and includes circuitry, which stops power supply to the display when the signal is received. Surplus power consumption of the electric cell is thereby eliminated.

17 Claims, 9 Drawing Figures

ELECTRONIC DEVICE FOR MONITORING POWER CONSUMPTION OF AN ELECTRO-OPTICAL DISPLAY

BACKGROUND OF THE INVENTION

This invention relates to an electronic device with an electro-optical display comprising, for example, liquid crystal display cells.

Many of the electronic devices with an electro-optical display previously provided do not include any circuit for protecting from undue increase in electric power consumption owing to, for example, the deterioration of the display cells or the short-circuiting of the electrodes of the cells. Such situations necessarily cause the shortening of the life of the electric battery used. In case of an electric timepiece having a booster circuit, the voltage drop due to temporary short-circuiting between the electrodes of the display cell obstructs the desired time keeping operation.

SUMMARY OF THE INVENTION

It is an object of this invention to provide an electronic device with an electro-optical display such, for example, electronic timepieces and table-type electronic calculators, which has a function of detecting the state wherein the power consumption of the display element unduely increases.

Another object of this invention is to provide an electronic device with an electro-optical display which has audible or visible alarm generation when undue increase in power consumption in the display is detected.

A further object of this invention is to provide an electronic device with an electro-optical display which includes means for stopping the supply of electric power to the display when the power consumption of the display unduly increases and this undue increase is detected.

According to this invention, a driving circuit for a display is connected to an electric battery through a resistance.

In order to decrease the energy loss due to the resistance, a Metal-Oxide-Semiconductor (MOS) transistor is connected in parallel with the resistor.

For the same purpose as above, the power consumption in the display is periodically detected and the result obtained is memorized and cleared periodically.

In one aspect of this invention, stopping of the electric energy supplied to the display may be performed by sending to all of the electrodes of the display, signals which coincide in voltage, phase and frequency with each other. The supply of the signals equal in voltage, phase and frequency to the electrodes of the selected display segment or segments is useful in obtaining a visual alarm and decreasing the electric power supplied to the display.

Other features and advantages of this invention will be more fully understood from the following description with reference to the accompanying drawings, in which:

In the drawings:

FIG. 7A shows a display surface of a liquid crystal display element as in the normal state and FIG. 7B shows the surface as in the unordinary state.

DESCRIPTION OF THE PREFERRED EMBODIMENT

Figure 1:
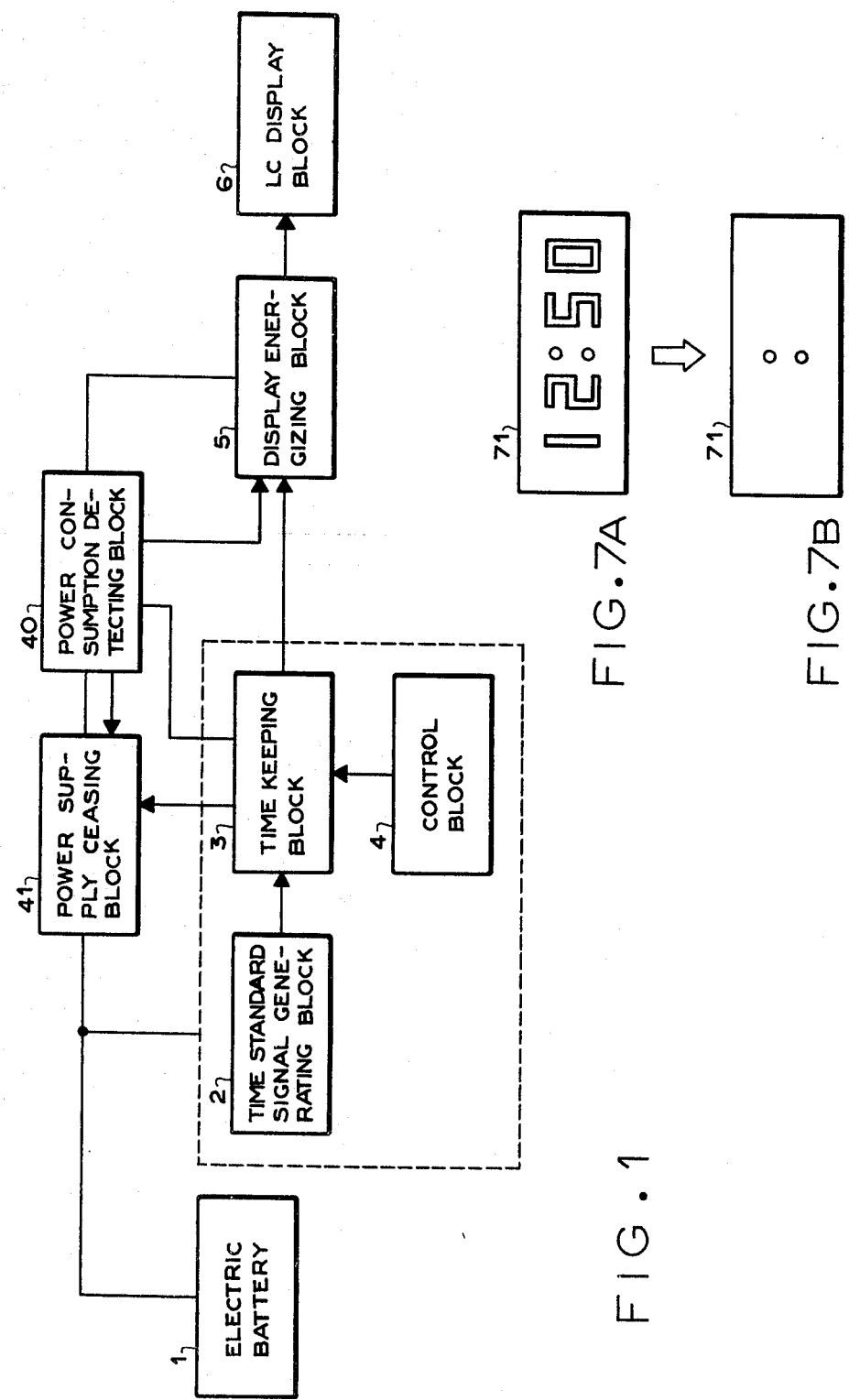
FIG. 1 is a block diagram of the electronic device embodying this invention.

Referring to the drawings, more particularly to FIG. 1, the reference numeral 1 designates an electric battery or cell, 2 a time standard signal generating block, 3 a time keeping block, 4 a control block for performing time adjustment and other operations, 5 a liquid crystal display element energizing block, 6 a liquid crystal display block, 40 a power consumption detecting block and 41 a block for ceasing or interrupting the supply of electric power.

The block 41, which is not provided in known electronic devices, acts to interrupt or stop the supply of electric power to the energizing block 5 in accordance with the signal generated in the block 40 when the power consumption in the liquid crystal display element increases above a predetermined value. Therefore, it is possible to eliminate undue consumption of energy stored in the battery, because the power supply to the display element is ceased or stopped, that is, the power consumption in the display element becomes zero. The means for stopping the power supply to the liquid crystal element can be provided in the energizing block 5 instead of in the block 41. Since the power supply to the time keeping system including the blocks 2, 3 and 4 is continued at this time, the correct time can be maintained and displayed after the cause for which the excessive power consumption occurs is removed. In case of a timepiece using a booster circuit, the power consumption detecting block 40 and power supply interrupting block 41 are connected in series with each other and inserted in the line to which the boosted current is supplied.

Figure 2:
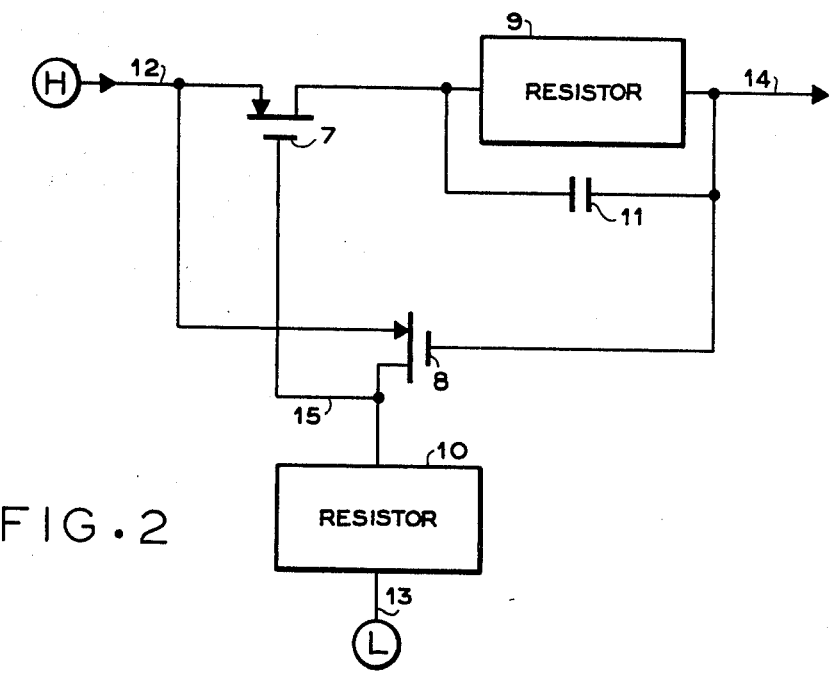
FIG. 2 is a circuit diagram of a detecting block and stopping block used in the device of FIG. 1.

In FIG. 2 shows a detailed circuit diagram of the power consumption detecting block 40 and power supply interrupting block 41.

The source electrode of a P-channel MOS FET 7 is connected to a high potential (hereinafter referred to as "H") point through a line 12 and the drain electrode thereof to the line 14 through a parallel circuit consisting of a resistor 9 and capacitance 11. Another P-channel MOS FET 8 has a source electrode connected to H, a drain electrode connected to the gate electrode of the FET 7 as well as to a low potential (referred to as "L") point through a line 13 having a resistor 10 and a gate electrode connected to the line 14. The line 14 is provided for connecting the parallel circuit and the gate of the FET 8 to the power source of the block of which power consumption is to be detected, namely, the display energizing block 5 in FIG. 1.

The operation of the circuit in FIG. 2 is as follows:

An electric current flows from the point H to the block 5 through the FET 7 and resistor 9, resulting in the voltage drop corresponding to the current flowing through the block 5. When the voltage drop is lower than the threshold voltage of the P-channel MOS FET 8, the potential on the line 15 is still kept L, since the FET 8 is kept cut off. In this state the FET 7 is held turned on and the power supply to the block 5 is continued. The capacitance 11 is provided for passing current momentary flowing therethrough.

When the voltage between both ends of the resistor 9 becomes higher than the threshold voltage of the FET 8, the MOS FET 8 is turned on and the potential on the line 15 becomes H. Accordingly, the power supply to the block 5 ceases owing to the turning on of the P-channel MOS FET 8 and the cutting off of the FET 7. If the actual resistance of the resistor 9 and the threshold voltage are properly selected with respect to their mutual relationship, then the power supply to the block 5 will cease when the flow of the current increases over the predetermined value. From the view point of reduction in power loss, it is desirable that the resistance of the resistor 9 and the ON resistivity of the FET 7 is selected to be as small as possible.

In case that means for causing the power supply to cease is provided in the display energizing block and the signal on the line 15 is sent to the energizing block, the FET 7 can be omitted.

Figure 3A:
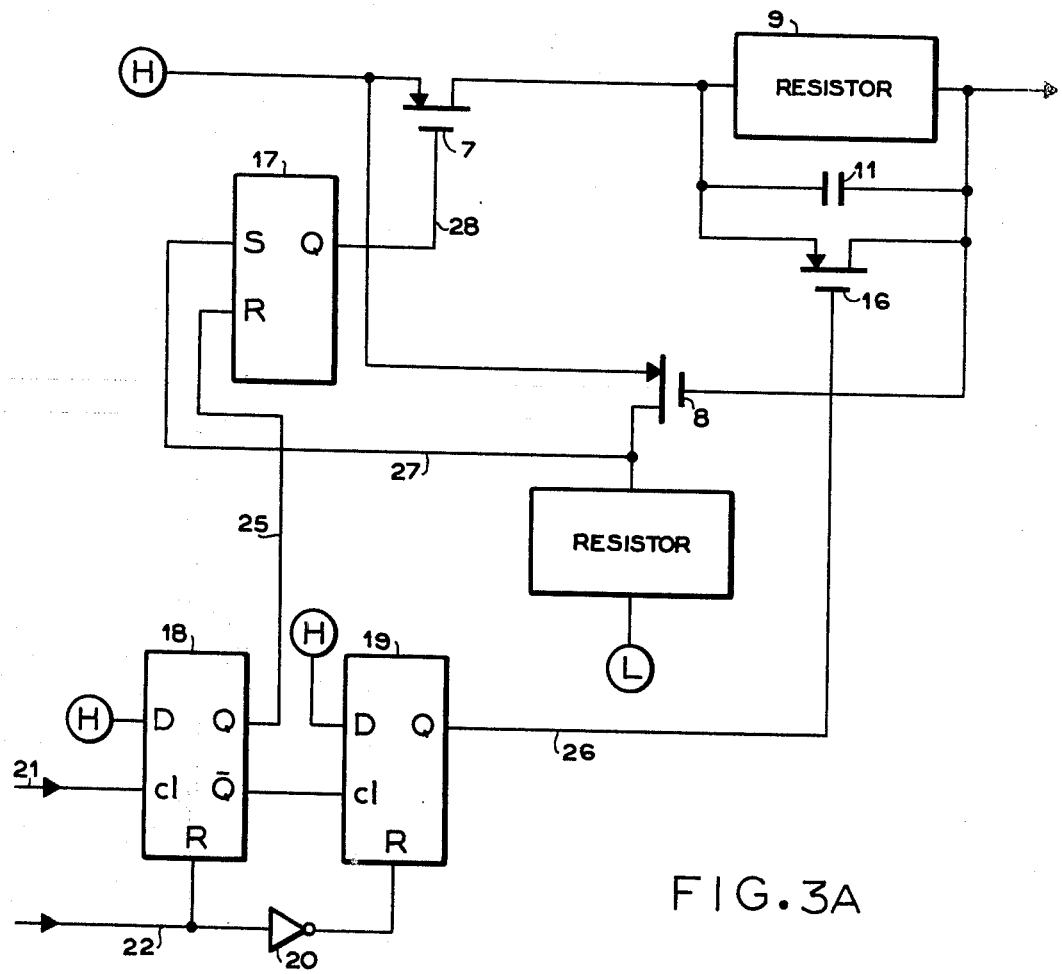
FIG. 3A shows a circuit diagram of another embodiment for a detecting block and ceasing block.

FIG. 3A shows a circuit as equivalent to that shown in FIG. 2 with the exception that, for the purpose of performing the periodic detection of the power consumption, a P-channel MOS FET 16, a set-reset flip-flop 17, data-type flip-flops 18 and 19 and an invertor 20 are added to the circuit of FIG. 2, the same or similar parts in FIG. 2 and 3 being denoted by the same reference numerals.

The data-type flip-flop 18 has a data input connected to the H point, a reset input to a input of the invertor 20, an output to a reset input of the set-reset-type flip-flop 17 and a reverse output to a clock input of the flip-flop 19. A data input of the flip-flop 19 is connected to H, and the output of the flip-flop 19 is connected to gate electrode of the P-channel MOS FET 16, a source electrode of which is connected to the drain electrode of the FET 7 and a drain electrode of which is connected to the gate electrode of the FET 8. Also, a reset input of the flip-flop 17 is connected to the drain of the FET 8 and an output to the gate of the FET 7.

Figure 3B:
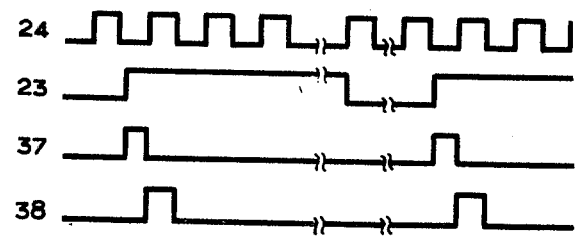
FIG. 3B is a timing chart of the signals appearing in the several points of the circuit shown in FIG. 3A.

In the circuit of FIG. 3A, the wave forms of which are shown in FIG. 3B at 23 and 24, when the signals are supplied to the lines 21 and 22, respectively, the signals having wave forms shown at 37 and 38 will appear on the line 25 and 26, respectively. The P-channel MOS FET 16 acts as an electronic switch provided for reducing the power loss at the ordinary state. If the ON resistivity is small, the combined resistance with the resistor 9 is kept small, because the FET 16 is turned on when the potential on the line 26 is kept L, thereby resulting in small power loss at this part. The voltage drop occurred at the resistance 9 and MOS FET 16 is small when the FET 16 is turned on, so that the MOS FET 8 is cut off and the potential on the line 27 becomes L. Therefore, the flip-flop 17 is not set and the FET 7 is kept turned on to continue the power supply to the block 5.

When the potential 26 is changed to H, the P-channnel MOS FET 16 is turned off and a current flows only through the resistor 9. Since the resistance of the resistor 9 is larger than the ON resistance of the FET 16, the sufficient voltage drop causes the FET 8 to turn on when the power consumption in the block 5 is large. At this state, the set-reset-type flip-flop 17 is set owing to the change in potential on the line 27 to H, and the potential on the line 28 becomes H. As the result, the FET 7 is cut off to cease the power supply to the block 5.

The set-reset-type flip-flop 17 is periodically reset by the signal appearing on the line 25 to generate a signal for turning on the FET 7. Thereafter the FET 16 is immediately cut off by the signal on the line 26 so as to measure the power consumption, the result obtained being memorized in the flip-flop 17 until the next reset timing, i.e., the next sampling. Therefore, the correct time can be displayed after the display element returns to its ordinary condition, if the increase in power consumption is raised by a temporary failure, such as a short circuiting occurred in the liquid crystal display element.

If means for interrupting the power supply is provided in the display energizing block, the FET 7 may be excluded and the signal on the line 28 may be sent directly to the display energizing block.

The signal 23 which determines the sampling period and the signal 24 which controls the duration of the measurement can easily be obtained from the time keeping system. The accuracy of the measurement on power consumption can be improved, if the time of sampling can be selected to be inconsistent with the reverse timing of the display energizing signal, because it is unnecessary to measure an alternating current the potential of which is changing. In this status, the use of the capacitor 11 can be omitted for the same reason. In addition, since a current flows through the resistor 9 during a very short time on sampling, it is possible to select a resistor having a large resistance without considering the increase in power loss, resulting in easier selection of the threshold voltage of the P-channel MOS FET 8. Also, addition of a circuit for supplying a power periodically regardless with the result of measurement to the block to be measured is applicable in displaying the correct time even when the power consumption in the liquid crystal display element increases.

Figure 4:
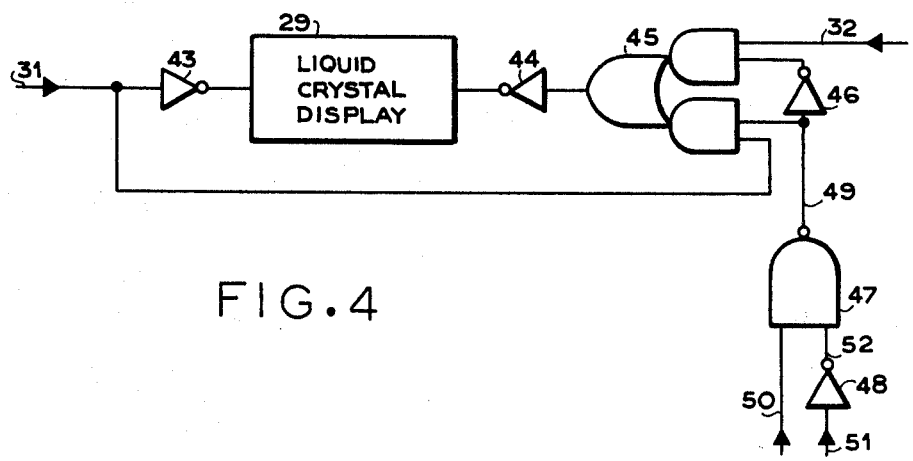
FIG. 4 is a block diagram of a display energizing circuit with means for interrupting the supply of electric power.

FIG. 4 shows a preferable circuitry of the display energizing block having means for stopping the power supply to the display to be measured.

In FIG. 4, the output of an inverter 48 is connected to one of the inputs of a NAND gate 47, the output of the NAND gate 47 is connected to the input of an inverter 46 and to either of the inputs of an AND-OR gate 45, the output of the inverter 46 is connected to the other inputs of the AND-OR gate 45, the input of an inverter 43 is connected to the input of the AND-OR gate to which the output of the NAND gate 47 is connected, the output of the AND-OR gate 45 is connected to the input of an inverter 44, the output of the inverter 44 to one of the segment electrodes of a liquid crystal display element 47, and the output of the inverter 43 to the common electrode of the display element.

The signal for energizing the display element, in the circuit shown in FIG. 4, is supplied to lines 31 and 32. In general, the signals supplied to the lines 31 and 32 are in a relation in which the phase of one of the signals is reversed to that of the other. When the potential on the line 49 is H, the AND-OR gate 45 selects the signal on the line 31 and sends out it. As a result, the same signals are supplied to the common electrode and segment electrodes, so that the liquid crystal display element 29 is deenergized. On the other hand, when the potential on the line 49 is L, the AND-OR gate 45 selects the signal on the line 32. In this state an alternating voltage is impressed across the common and segment electrodes so that the display element 29 is energized to display an information corresponding to the display information signal supplied through a line 50.

The output from the power consumption detecting block, i.e., the signal on the line 15 in FIG. 2 or the signal on the line 28 in FIG. 3 is supplied to line 51. The potential of this signal is kept L at the normal state and changed to H when the power consumption in the display element 29 increases unduly. Accordingly, the potential on a line 52 is H at the normal state so that the potential on the line 49 is determined only by the display information signal supplied to the line 50 and the liquid crystal display element 29 is energized in accordance with the display information signal.

If the potential on the line 51 becomes H owing to the increase in power consumption, the potential on the line 49 becomes H due to the change in potential on the line 52 to L regardless with the display information signal supplied on the line 50, resulting in that the display element 29 is not supplied with any power.

Figure 5:
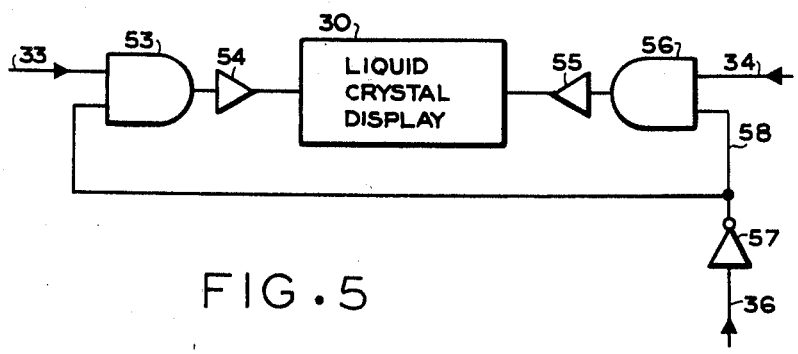
FIG. 5 is a block diagram of another energizing circuit with means for interrupting the supply of electric power.

FIG. 5 shows another circuit having the same function as and modified from that shown in FIG. 4, wherein the output of an inverter 57 is connected to one input of each AND gates 53 and 56, the output of the AND gate 53 to the input of a buffer driver 54, the output of the AND gate 56 to the input of another buffer driver 55, the output of the buffer driver 54 to the common electrode of a liquid crystal display element 30, and the output of the buffer driver 55 to one of the segment electrodes.

The energizing signal is supplied to the other input of the AND gate 53 and the othe energizing signal selected in accordance with the display information signal is sent to the other input of the AND gate 56 via a line 34. The input of an inverter 57 is supplied via line 36 with an output signal from the circuit for detecting the power consumption in the display element.

When the power consumption in the display element is in the normal range, the potential on the line 36 is L and that on the line 58 is H, so that the display element 30 is energized in accordance with the display information signal. If the potential on the line 36 becomes H due to the increase in power consumption, then the potential on the line 58 becomes L. Namely, the common and segment electrodes eventually have the same potential L thereby not consuming any power at all.

Figure 6:
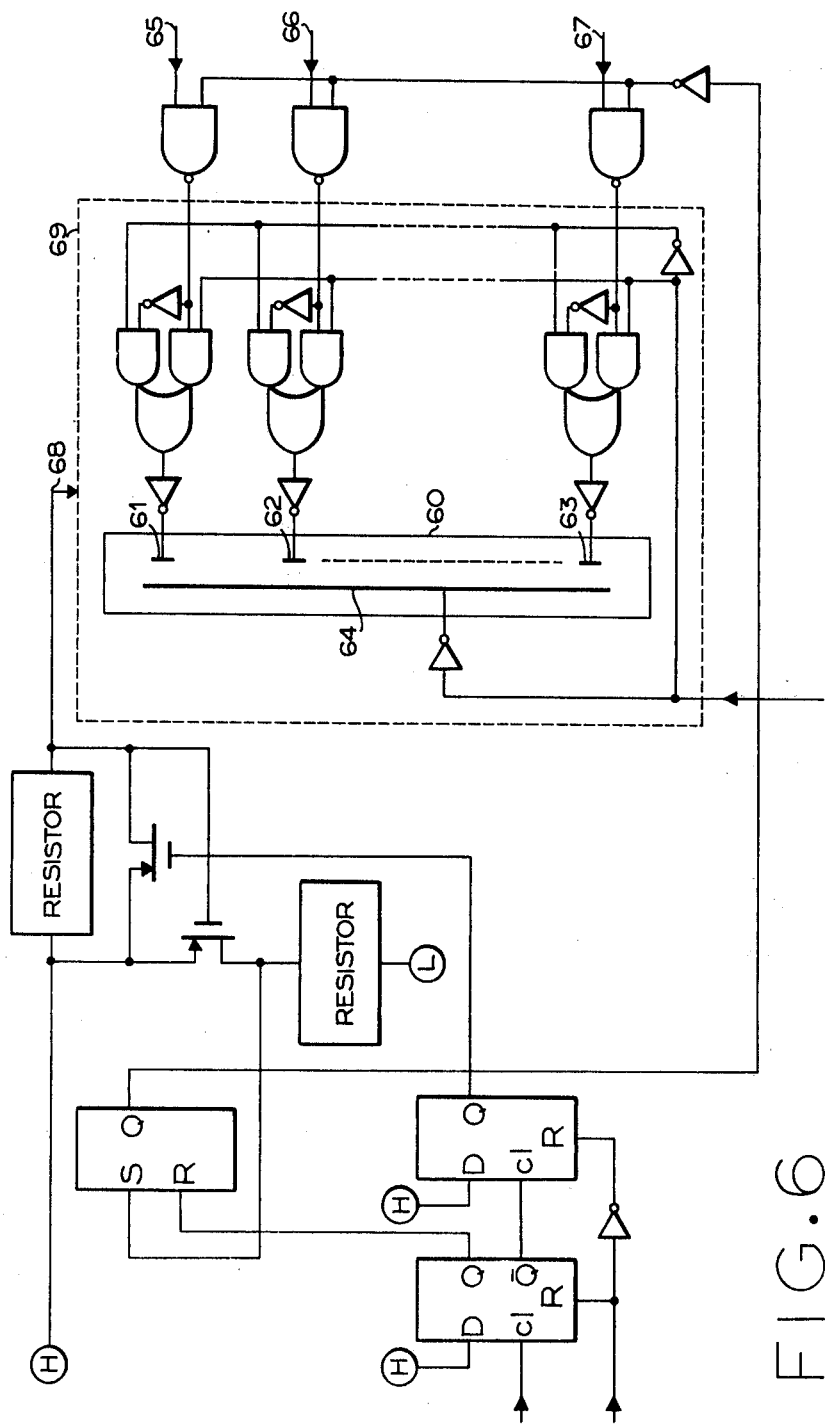
FIG. 6 shows the connection of the display energizing circuit and a liquid crystal display element.

The circuit shown in FIG. 6 is a combination comprising a power consumption detecting block as shown in FIG. 1, a display energizing block having means for stopping the power supply and a liquid crystal display element as shown in FIGS. 3A and 4.

In FIG. 6, the reference numeral 60 denotes a liquid crystal display element having a plurality of segment electrodes dipicted at 61 to 63 and a common electrode 64. To lines 65 to 67 are supplied display information signals, respectively, in order to energize the display element. Electric power is supplied through a line 68 to the block surrounded by the dotted line 69. Other parts and the operation thereof have been discribed with reference to FIGS. 3A and 4.

FIG. 7A illustrates a display surface of a liquid crystal display element 71 having five display portions, the first and second portions indicating the hour, the third portion indicating a colon and the fourth and fifth portions indicating minutes. At the ordinary state the necessary numerals for indicating hour and minute appear on the display surface, but all of the numerals will disappear leaving a colon, as shown in FIG. 7B, when the undue increase in power consumption occurs. Such alteration of the displayed information may be performed by supplying the same signals in regard to their voltage, phase and frequency to the electrodes excepting the segment electrodes for indicating a colon.

The indication for making a recognition of the state of disorder on power consumption and the like may be performed by modulation of the indication such as flashing, or by indicating a specified figure, letter or other pattern or by causing the desired indication intermittently. In any case, it is effective to employ a display element in which the selected parts energized on the disorder state have a structure which is not troublesome short circuiting.

Although the foregoing description has been made to the electronic devices having liquid crystal display elements, it is needless to say that this invention is applicable to electronic devices including other electro-optical display than the liquid crystal display.

What is claimed is:

1. An electronic device for use with electronic appliances, wherein said appliances include a battery cell for supplying electric power, a reference signal generator for generating a reference signal, logic circuitry responsive to said reference signal for supplying an operating signal for driving said display device, wherein said device comprises:
   a detection circuit disposed between said battery cell and said driving circuit;
   means within said detection circuit for monitoring power consumption of said driving circuit and thereby measuring the power consumption of said display device;
   means within said detection circuit for generating a detection signal, when the power consumption exceeds a predetermined level.

2. An electronic device, as defined in claim 1, which further includes means for generating an alarm by altering the indication of said display.

3. An electronic device as defined in claim 1 which further comprises means for interrupting the electric power supplied to at least a part of said display.

4. An electronic device, as defined in claim 1, wherein said detecting circuit includes a resistor disposed between said battery and said energizing circuit for causing a voltage corresponding to the power consumption in said display.

5. An electronic device, as defined in claim 4 further including a Metal-Oxide-Semiconductor transistor connected to said detection circuit for connecting both ends of said resistor, when turned on by the detection signal from said detecting circuit.

6. An electronic device, as defined in claim 5, wherein said detecting circuit includes means for intermittently monitoring the power consumption in said display, a memory for storing the result of monitoring by said detecting means, and means for intermittently clearing said memory.

7. An electronic device as defined in claim 1 wherein said electro-optical display comprises a liquid crystal display element.

8. An electronic device, as defined in claim 7, wherein said means for interrupting electric power includes means for supplying signals to all of the electrodes of said display, which are equal in voltage, phase and frequency.

9. An electronic device, as defined in claim 7, wherein said means for interrupting electric power includes means for supplying signals to the selected electrodes of said display, which are equal in voltage, phase and frequency.

10. The electronic device of claim 1 further comprising:
    means for generating an alarm signal, in response to generation of said detection signal.

11. An electronic device as defined in claim 10 wherein said alarm generating means includes means for generating a signal for indicating a specified pattern on said display.

12. The electronic device of claim 10, wherein the display includes means for indicating generation of the alarm signal.

13. The electronic device of claim 3, wherein said means for interrupting the power consumption continues to function, as long as the detection signal is generated.

14. The electronic device of claim 1, wherein the appliance is a timepiece.

15. The electronic device of claim 1, wherein the appliance is an electronic calculator.

16. The electronic device of claim 13, wherein the appliance is a timepiece.

17. The electronic device of claim 13, wherein the appliance is a calculator.

* * * * *